Oct. 10, 1939.  J. PETRICH  2,175,912
ELECTRIC HEATER MIXING DEVICE
Filed June 16, 1938   2 Sheets-Sheet 1
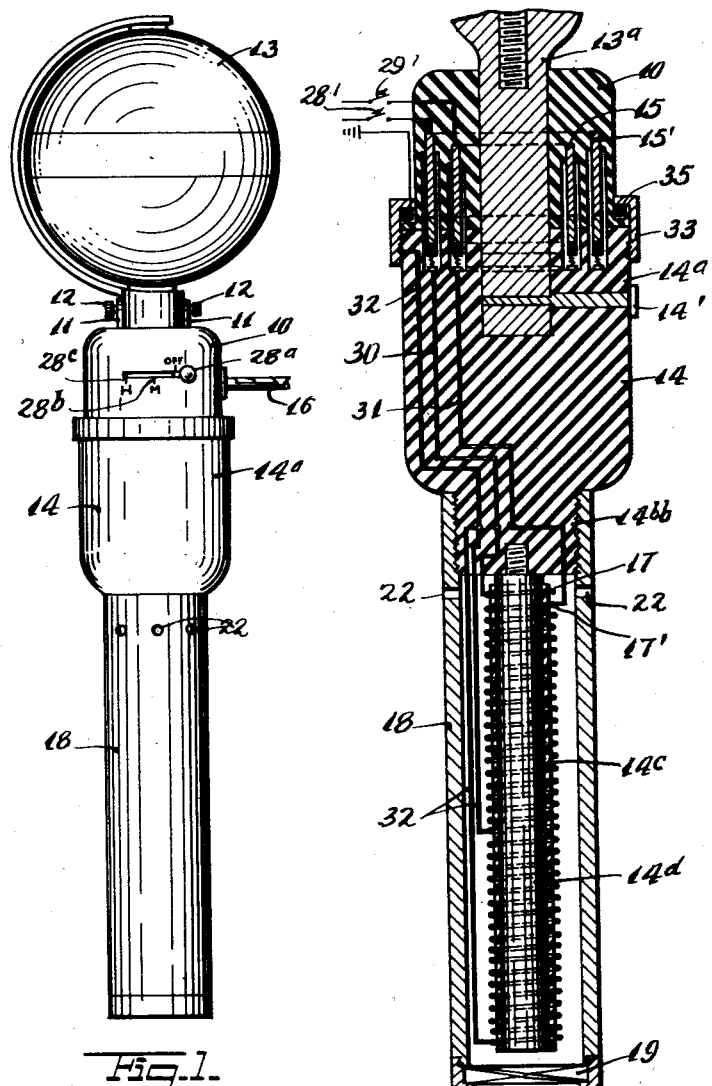
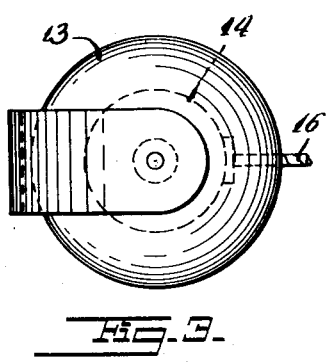
INVENTOR
Jerry Petrich
BY
ATTORNEY Oct. 10, 1939.    J. PETRICH    2,175,912
ELECTRIC HEATER MIXING DEVICE
Filed June 16, 1938    2 Sheets-Sheet 2
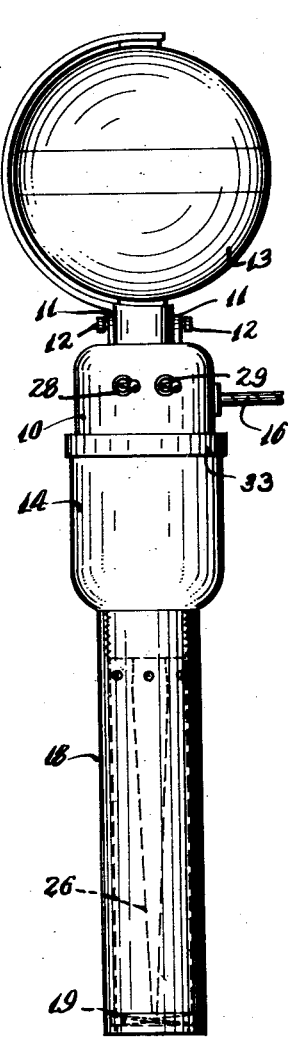
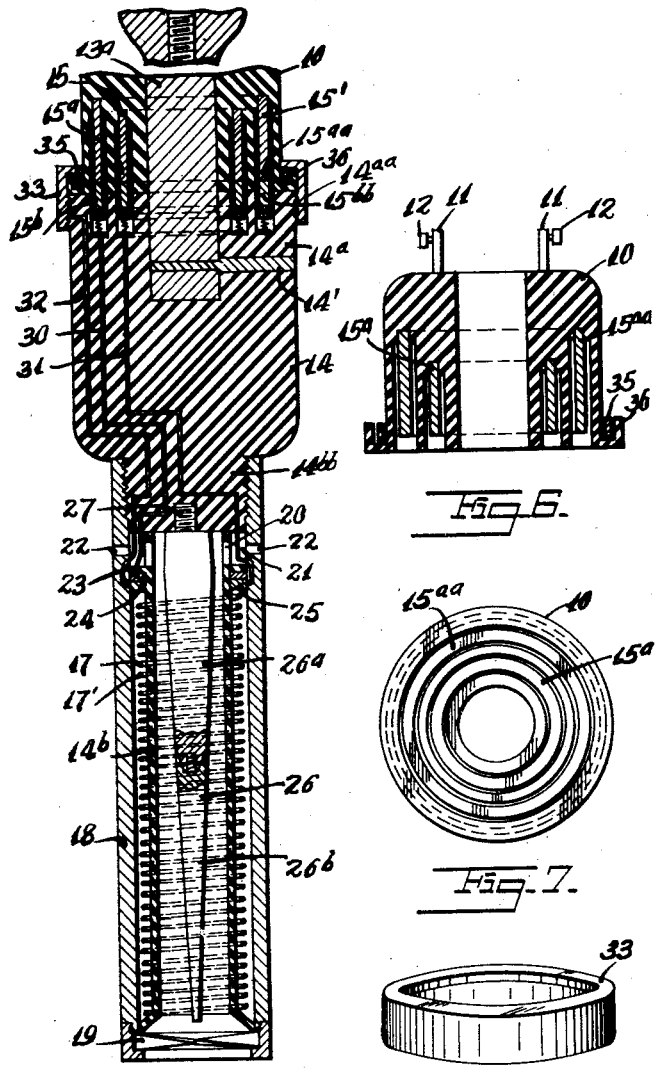
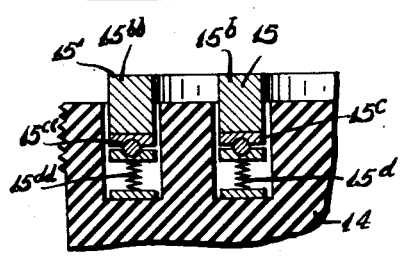
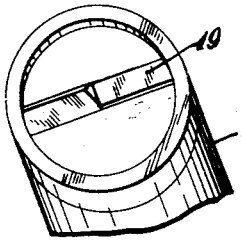
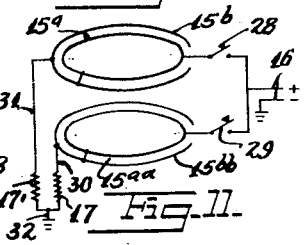
INVENTOR
Jerry Petrich
BY
ATTORNEY Patented Oct. 10, 1939

2,175,912

UNITED STATES PATENT OFFICE 2,175,912

ELECTRIC HEATER MIXING DEVICE

Jerry Petrich, New York, N. Y.

Application June 16, 1938, Serial No. 213,993

5 Claims. (Cl. 219—41)

This invention relates to new and useful improvements in an electric heater mixing device.

The invention has for an object the construction of a device as mentioned which is characterized by the fact that it is provided with several heating windings so that various degrees of heat may be supplied. With this arrangement it is possible to permit one of the windings to be continuously operative to keep the electric heater in a warm condition so that it may readily heat up to full heat when required by the turning on of the additional winding or windings.

Still further the invention proposes an arrangement by which the heating windings are mounted on a hollow tubular portion connected with the shaft of an electric motor or similar prime mover so that there is simultaneous mixing and heating of the fluid into which the device is applied.

Still further the invention proposes a novel arrangement by which the fluid is caused to come in intimate contact with the heating portion of the device in a manner so that the heat is quickly transferred to the fluid.

Still further the invention proposes the use of a novel commutator construction for transferring the current from stationary parts to moving parts of the device.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side elevational view of a device constructed according to this invention.

Fig. 2 is a vertical sectional view of a portion of Fig. 1.

Fig. 3 is a top plan view of Fig. 1.

Fig. 4 is a side elevational view of a device constructed according to another embodiment of this invention.

Fig. 5 is a vertical sectional view of a portion of the device shown in Fig. 4.

Fig. 6 is a sectional view of a portion of the device shown in Fig. 5.

Fig. 7 is a bottom elevational view of the parts shown in Fig. 6.

Fig. 8 is a perspective view of a ring used in the device.

Fig. 9 is a fragmentary enlarged detailed view of a portion of Fig. 5.

Fig. 10 is a fragmentary bottom perspective view of the lower end of Fig. 5.

Fig. 11 is a schematic wiring diagram of the device.

The electric heater mixing device, according to this invention includes a casing 10 provided with several lugs 11 through which screws 12 engage by which the casing is attached to the stationary portion of an electric motor 13. A body 14 is secured by a pin 14′ to an adaptor shaft 13ª for attachment on the shaft of the electric motor 13. This body has an end portion 14ª adjacent the casing 10. The body 14 also has an extending hollow cylindrical portion 14bb.

Concentric commutators 15 and 15′ are mounted on the adjacent portions of the casing 10 and the body 14. An electric cable 16 is connected with the casing 10 and is intended to supply current from some source to the commutators 15 and 15′ as hereinafter more fully described. Heating windings 17 and 17′ are mounted on an insulation tube 14ᶜ on a rod 14ᵈ attached on the cylindrical portion 14bb. A circuit is provided for connecting the cable 16, the commutators 15 and 15′, and the heating windings 17 and 17′ in a circuit as hereinafter more fully described.

A tubular casing 18 is engaged over the hollow cylindrical portion 14bb for encasing the heating windings 17 and 17′. This tubular casing 18 is threadedly mounted upon the portion 14bb. Its lower end is provided with fan blades 19 arranged to drive fluid through the tube 18 during the operation of the device. Openings 22 are formed in the upper end of the tube 18 through which the fluid driven therein may discharge.

The windings 17 and 17′ are controlled by a circuit which includes leads 30, 31 and 32. Lead 32 is a ground lead and at one of it sends it is provided with branches 32′ connecting with one of the ends of each of the windings 17 and 17′. At its other end the lead 32 connects with a conductor ring 33 which is grounded to a ground contact ring 35.

The lead 30 connects with one of the other ends of one of the heating windings and connects with the electric transmission means 15′, which in turn is connected in a circuit controlled by a switch 28′. The lead 31 connects with the electric transmission system 15 and in turn with a circuit controlled by a switch 29′. Preferably the switches 28′ and 29′ are mounted upon the body 10 and controlled by a handle 28ª (see Fig. 1). This handle 28ª may be placed in the "off" position or in the medium position, indicated by 28ᵇ, or in the "hot" position indicated by 28ᶜ.

The operation of the device is as follows:

The electric motor 13 is energized to cause the body 14 and the parts mounted thereon to rotate. The switch 28' may be closed to send a circuit through the winding 17 causing a predetermined amount of heat. If desired, the switch 29' may be closed to send a current through the winding 17' to cause a different amount of heat. Liquid to be heated and mixed by the device is placed in a vessel which is then engaged upwards so that the lower portion of the device extends therein. The fan 19 will drive the liquid up through the tubular member 18 and out from the openings 22. Thus the liquid will be propelled in the vicinity of the heating windings and so become heated. Because of the circulation of the liquid it will also tend to mix.

In Figs. 4–11 inclusive a modified form of the device has been illustrated which distinguishes from the prior form essentially in the arrangement of the heating windings. In this form the heating windings 17 and 17' are mounted on a tubular member 14ᵇ which is attached at its upper end on the cylindrical portion 14ᵇᵇ. This tubular member is provided with openings 20 substantially aligned with the openings 22.

The several openings 20 connect with an annular space 21, which in turn connects with several openings 22 formed in the casing 18. A waterproof joint is provided at the top of the cylindrical portion 14ᵇ for keeping the liquid from reaching the heating windings 17 and 17'. This waterproof joint comprises a flange 23 formed on the cylindrical portion 14ᵇ and cooperative with a gasket 24 which is forced against a flange 25 mounted on the inner portion of the tubular casing 18.

A member 26 is mounted within the hollow cylindrical portion 14ᵇ for thinning out the mass of fluid passing through it so that this mass of fluid assumes a relatively shallow thickness to be in intimate contact with the inner face of the cylindrical portion 14ᵇ for thinning out the mass verted conical form. It is held in position by a reduced threaded shank 27 at one end threadedly engaging the body 14. The member 26 is made from several detachable sections. There is an inner section 26ª and an outer section 26ᵇ threadedly connected together. One or more of these sections may be removed so as to increase or decrease the compass within the cylindrical portion 14ᵇ for a better control of the temperature of fluid passing through the cylindrical portion. When one or more of the sections of the member 26 are removed a larger mass of fluid will be capable of passing through in a form of greater thickness, and consequently it will not be heated as efficiently as if a thinner mass were passing.

Switches 28 and 29 are mounted on the casing 18 and are arranged in the electric circuit previously mentioned. The cable 16 contains two wires; one wire is connected with a ground of the device (see Fig. 8), and the other is connected with the switches 28 and 29 in parallel. The switch 28 connects wth a stationary conductor ring 15ª mounted within an annular recess in the casing 18. This stationary conductor ring 15ª is engageable with an annular ring 15ᵇ resiliently supported by a thrust bearing 15ᶜ. The annular ring 15ᵇ and thrust bearing 15ᶜ are mounted within an annular groove formed in the adjacent portion of the body 14. A spring 15ᵈ, also mounted in the groove, comprises the resilient means for resiliently urging the annular ring 15ᵇ into intimate contact with the ring 15ª.

The switch 29 connects with a commutator section 15ªª engageable with a conductor ring 15ᵇᵇ. The conductor ring 15ªª is supported in the casing 18. The conductor ring 15ᵇᵇ is supported by a thrust bearing 15ᶜᶜ and by a spring 15ᵈᵈ. These latter parts are mounted upon the body 14.

A lead 30 connects the conductor ring 15ᵇᵇ with the winding 17. Another lead 31 connects the commutator section 15ᶜ with the winding 17. Still another lead 32 serves to ground the remote ends of the windings 17 and 17'. The lead 32 terminates at a threaded portion 14ªª on the top of the body 14 and connects with a conductor ring 33 threaded thereon and extending over a ground ring 35 mounted in a flange 36 on the casing 18. This grounds the lead 32.

The operation of the device is as follows:

A container of fluid to be stirred, and heated is engaged about the casing portion 18 of the heating and mixing device. The electric motor 13 is energized by a suitable switch (not shown on the drawings) so that its shaft will rotate the body 14 and the parts carried by the body. The switch 28 normally is in a closed position so that the winding 17 is being heated and so the device will have some degree of heat in it. When the fluid is to be heated to a higher temperature the other switch 29 is also closed. The circuit is now closed through the heating winding 17 and 17' and the device readily heats up.

The fluid will be driven by the fan 19 up through the cylindrical portion 14ᵇ and out from the passages 20, 21 and 22. The fluid so circulated will come in intimate contact with the wall of the cylindrical portion 14ᵇ and heat will be transferred to the fluid. Because the fluid must pass around the member 26 its thickness will be relatively thin and so will be readily heated during its passage.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a device of the class described, a body for engagement upon the drive shaft of an electric motor to be rotated thereby and having a projecting cylindrical portion, a tubular casing having one of its ends mounted on said cylindrical portion and having its other end engageable into a liquid to be mixed, a heater mounted within said tubular casing for heating the liquid into which said tubular casing is engaged, said casing having its free end projected beyond the adjacent end of said heater, said casing being formed with a plurality of openings in the end adjacent said cylindrical portion, and fan blades mounted upon and extending across said projected end for forcing said liquid through said casing past said heater and out through said openings as said motor rotates said casing to thoroughly mix and heat said liquid.

2. In a device of the class described, a body for engagement upon the drive shaft of an electric motor to be rotated thereby and having a projecting cylindrical portion, a tubular casing having one of its ends mounted on said cylindrical portion and having its other end engageable into a liquid to be mixed, a heater mounted within said tubular casing for heating the liquid into which said tubular casing is engaged, said casing having its free end projected beyond the adjacent end of said heater, said casing being formed with a plurality of openings in the end adjacent said cylindrical portion, and fan blades mounted upon and extending across said projected end for forcing said liquid through said casing past said heater and out through said openings as said motor rotates said casing to thoroughly mix and heat said liquid, said heater being extended through said tubular casing for reducing the compass thereof to limit the volume of liquid that will pass therethrough to cause said liquid passing therethrough to be heated to a much higher temperature.

3. In a device of the class described, a body for engagement upon the drive shaft of an electric motor to be rotated thereby and having a projecting cylindrical portion, a tubular casing having one of its ends mounted on said cylindrical portion and having its other end engageable into a liquid to be mixed, a heater mounted within said tubular casing for heating the liquid into which said tubular casing is engaged, said casing having its free end projected beyond the adjacent end of said heater, said casing being formed with a plurality of openings in the end adjacent said cylindrical portion, and fan blades mounted upon and extending across said projected end for forcing said liquid through said casing past said heater and out through said openings as said motor rotates said casing to thoroughly mix and heat said liquid, said heater being mounted upon the inner wall of said tubular casing, and means mounted on said cylindrical portion and extended into said heater for thinning the mass of liquid passing through said casing to cause the liquid passing therethrough to be heated to a much higher temperature.

4. In a device of the class described, a body for engagement upon the drive shaft of an electric motor to be rotated thereby and having a projecting cylindrical portion, a tubular casing having one of its ends mounted on said cylindrical portion and having its other end engageable into a liquid to be mixed, a heater mounted within said tubular casing for heating the liquid into which said tubular casing is engaged, said casing having its free end projected beyond the adjacent end of said heater, said casing being formed with a plurality of openings in the end adjacent said cylindrical portion, and fan blades mounted upon and extending across said projected end for forcing said liquid through said casing past said heater and out through said openings as said motor rotates said casing to thoroughly mix and heat said liquid, said heater being mounted upon the inner wall of said tubular casing, and means mounted on said cylindrical portion and extended into said heater for thinning the mass of liquid passing through said casing to cause the liquid passing therethrough to be heated to a much higher temperature, said means, comprising a conical-shaped member having its thick end mounted on said cylindrical portion and its thin end extended into said heater.

5. In a device of the class described, a body for engagement upon the drive shaft of an electric motor to be rotated thereby and having a projecting cylindrical portion, a tubular casing having one of its ends mounted on said cylindrical portion and having its other end engageable into a liquid to be mixed, a heater mounted within said tubular casing for heating the liquid into which said tubular casing is engaged, said casing having its free end projected beyond the adjacent end of said heater, said casing being formed with a plurality of openings in the end adjacent said cylindrical portion, and fan blades mounted upon and extending across said projected end for forcing said liquid through said casing past said heater and out through said openings as said motor rotates said casing to thoroughly mix and heat said liquid, said heater being mounted upon the inner wall of said tubular casing, and means mounted on said cylindrical portion and extended into said heater for thinning the mass of liquid passing through said casing to cause the liquid passing therethrough to be heated to a much higher temperature, said means, comprising a conical-shaped member having its thick end mounted on said cylindrical portion and its thin end extended into said heater, said member being formed of several sections releasably connected together in end alignment and separable from each other to decrease the length of said member to increase the compass of said tubular casing to control the temperature of the liquid passing through said casing.

JERRY PETRICH.